United States Patent [19]

Viskochil

[11] Patent Number: 4,631,431

[45] Date of Patent: Dec. 23, 1986

[54] LINEAR MOTOR HAVING IMPROVED MAGNETIC CHARACTERISTICS

[75] Inventor: Stephen R. Viskochil, San Jose, Calif.

[73] Assignee: Priam Corporation, San Jose, Calif.

[21] Appl. No.: 635,618

[22] Filed: Jul. 30, 1984

[51] Int. Cl.$^4$ ............................................. H02K 41/02
[52] U.S. Cl. ........................................ 310/13; 310/27
[58] Field of Search ................................... 310/13, 27

[56] References Cited

U.S. PATENT DOCUMENTS

| | | | |
|---|---|---|---|
| 3,666,977 | 5/1972 | Helms et al. | 310/13 |
| 3,723,780 | 3/1973 | Gillum | 310/13 |
| 3,735,163 | 5/1973 | Dijkstra et al. | 310/13 |
| 3,743,870 | 7/1973 | Hunt | 310/13 |
| 3,816,777 | 6/1974 | Metzgar | 310/13 |
| 3,889,139 | 6/1975 | Hughes | 310/13 |
| 4,121,124 | 10/1978 | Hunt | 310/13 |

Primary Examiner—Donovan F. Duggan

Attorney, Agent, or Firm—Flehr, Hohbach, Test, Albritton & Herbert

[57] ABSTRACT

A linear motor having improved magnetic characteristics in driving a coil and in preventing flux leakage which is particularly useful with a magnetic disc memory. The motor includes a magnetic housing having top and bottom surfaces, side surfaces and one end surface with the end surface including integral first and second magnetic center pieces. An end plate mates with the magnetic housing with the end plate having integral first and second magnetic center pieces which mate with the first and second magnetic center pieces of the housing. First, second, and third magnets are mounted to the top and bottom surfaces and one side surface of the magnetic housing in cooperative relationship with the first center piece. Fourth, fifth, and sixth magnets are mounted to the top and bottom surfaces and the other side surface of the housing in cooperative relationship with the second magnetic center piece. A coil is coupled to the first and second magnetic center pieces and drives a carriage assembly.

7 Claims, 9 Drawing Figures

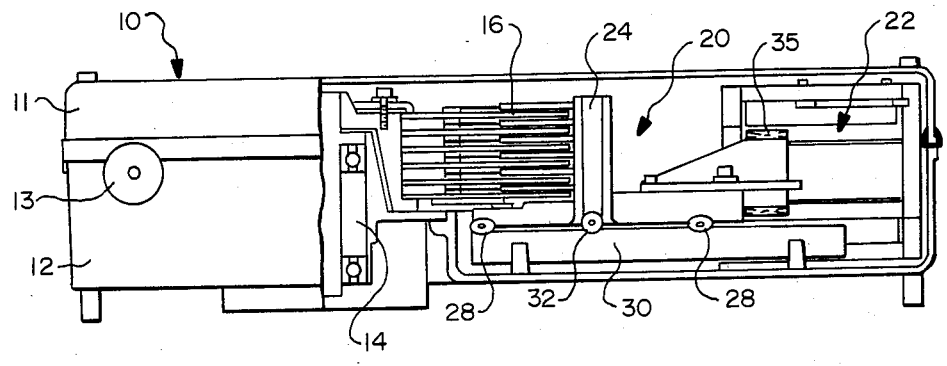
FIG.—1
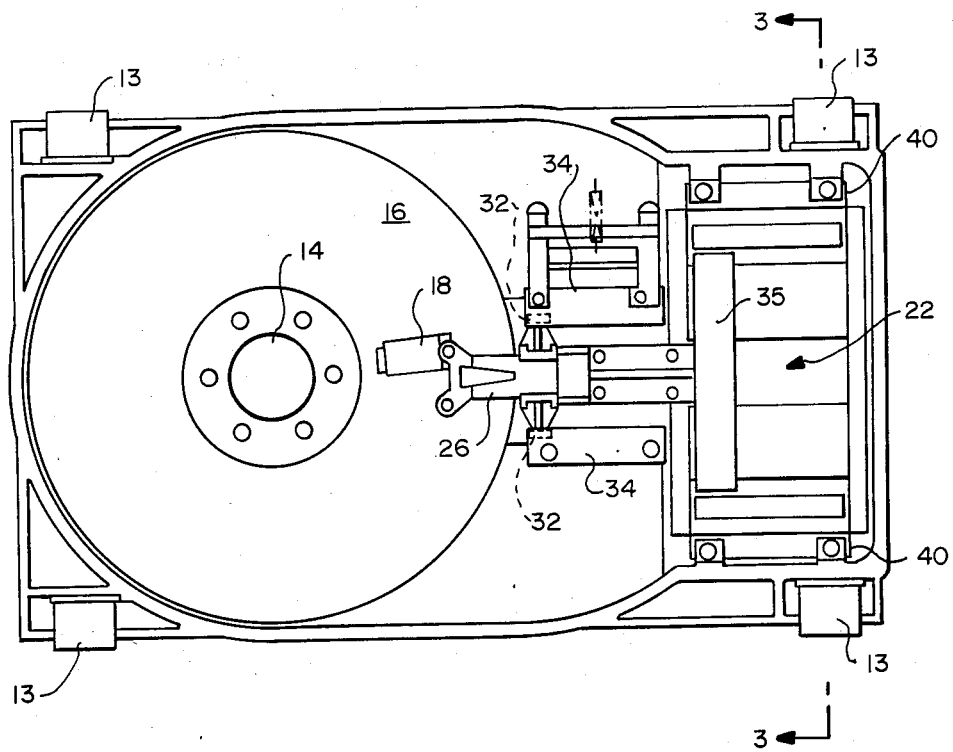
FIG.—2

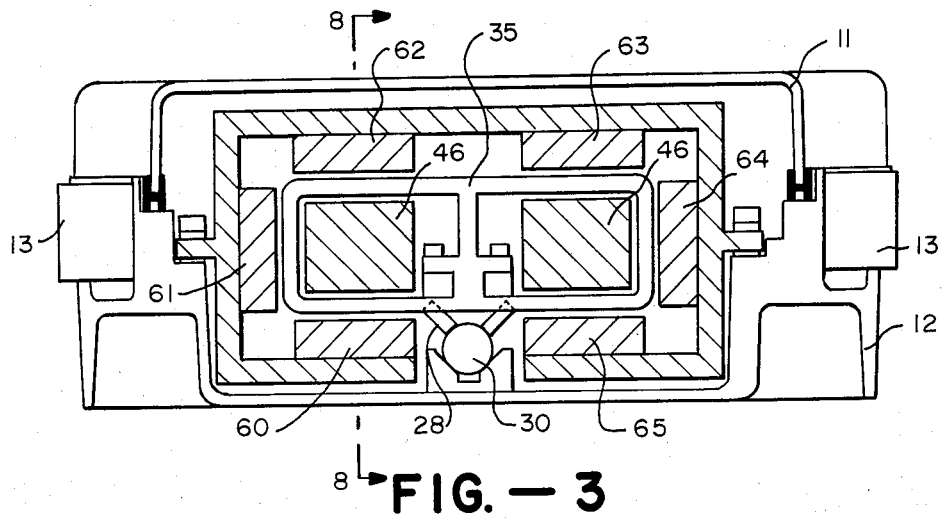
FIG. — 3
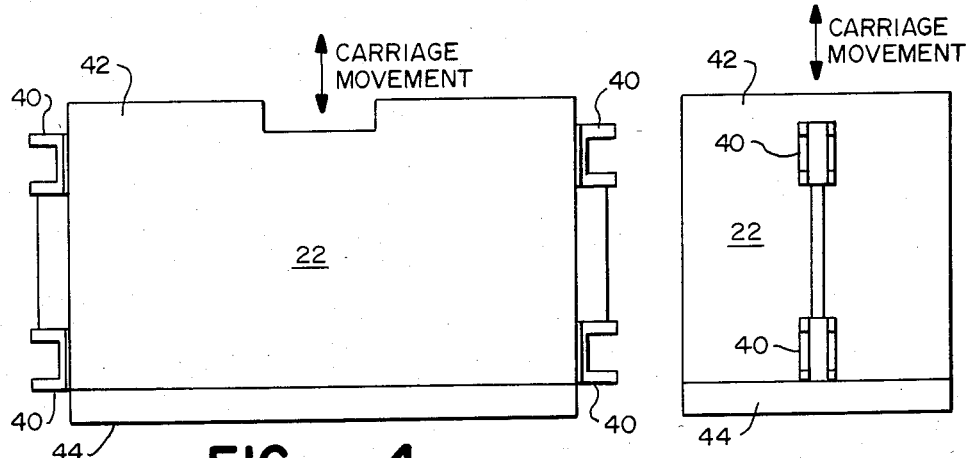
FIG. — 4
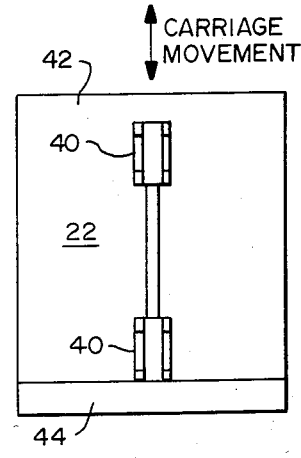
FIG. — 5
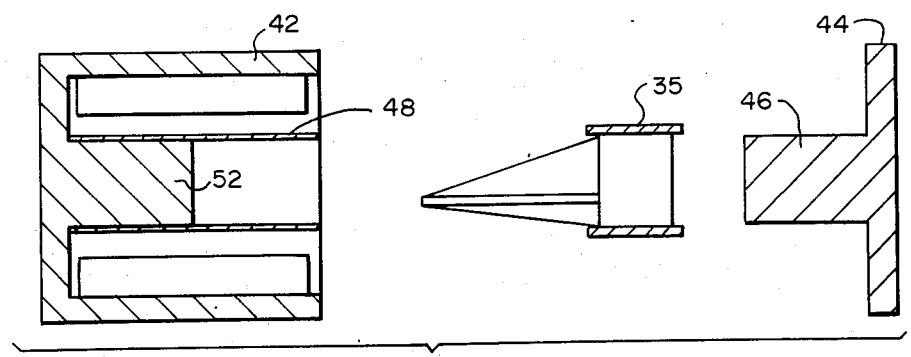
FIG. — 8

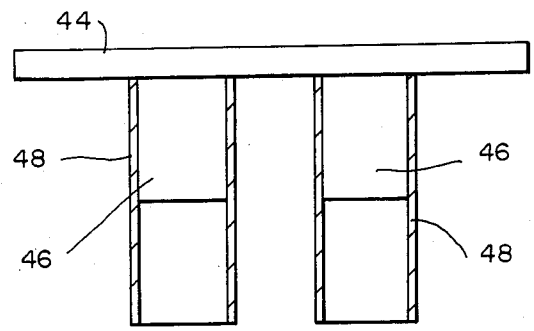
FIG.—6A
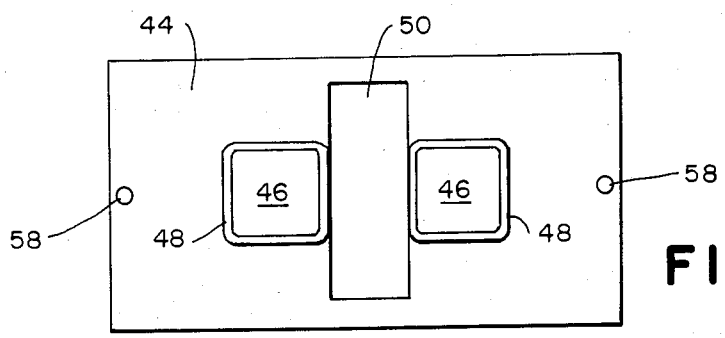
FIG.—6B
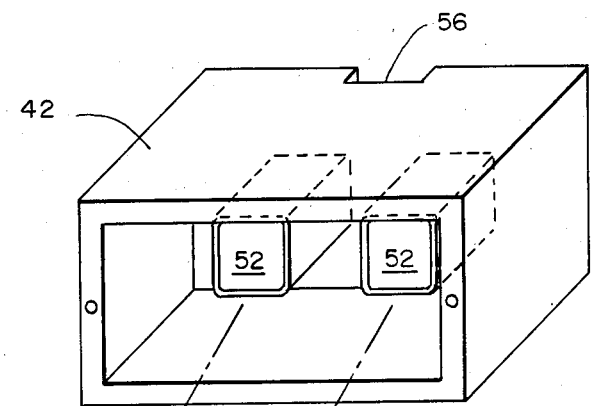
FIG.—7
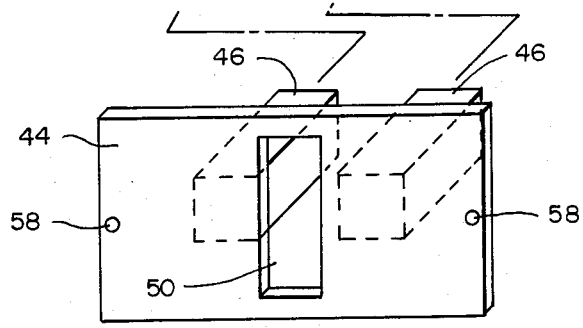

LINEAR MOTOR HAVING IMPROVED MAGNETIC CHARACTERISTICS

This invention relates generally to linear motors for use in disc drive memories.

The size of magnetic discs for use in magnetic memories has decreased with improvements in recording techniques which allow more density of recorded data on the disc surfaces. The overall size of the disc drives has decreased, also, due to the reduction in power needed in moving the recording heads and by positioning the head carriage drive motor alongside the carriage rather than end to end therewith.

This is exemplified by the linear motor disclosed in U.S. Pat. No. 4,414,594. The disclosed motor employs a split magnetic structure with the carriage assembly therebetween. One or more coils mounted to the carriage structure are coupled to the split magnetic structure. The carriage moves on parallel rails which include a spring bias on one rail for forced engagement with the rollers on the carriage assembly. In order to minimize vibration, the magnet support structures are integrally cast with a base support structure. The entire motor and carriage assembly is relatively complex and expensive to manufacture. Further, flux leakage can be a problem in such a motor and carriage design.

In accordance with the present invention a linear motor and carriage assembly with compact design is provided. The motor and carriage assembly is relatively simple in structure and therefore more easily and inexpensively manufactured. The motor housing and magnet support structure enhance the magnet coupling with the movable coil yet reduce flux leakage outside of the motor.

Accordingly, an object of the present invention is an improved linear motor for use with a magnetic disc drive and the like.

Another object of the invention is a compact linear motor with enhanced magnet characteristics.

Still another object of the invention is a linear motor with reduced flux leakage.

A feature of the invention is the use of side magnets along with top and bottom magnets in the motor.

Another feature of the invention is a magnetic structure consisting of two mating housing components.

Yet another feature of the invention is a two piece center piece construction.

The invention and objects and features thereof will be more readily apparent from the following detailed description and appended claims when taken with the drawing, in which:

FIG. 1 is a side view partially in section of a disc drive illustrating a linear motor and carriage assembly in accordance with one embodiment of the invention.

FIG. 2 is a top view partially in section of the disc drive of FIG. 1 further illustrating the linear motor and carriage assembly.

FIG. 3 is a section view of the linear motor and carriage assembly taken along the line 3—3 in FIG. 2.

FIG. 4 is a top view of the linear motor in the disc drive of FIG. 1.

FIG. 5 is a side view of the linear motor of FIG. 1.

FIG. 6A and FIG. 6B are a top view and front view of an end plate of the linear motor of FIG. 1.

FIG. 7 is an exploded perspective view illustrating the end plate and magnetic housing of the linear motor of FIG. 1.

FIG. 8 is an exploded side view of the linear motor of FIG. 1.

Referring now to the drawings, FIG. 1 is a side view partially in section of a magnetic disc drive including a linear motor and carriage assembly in accordance with one embodiment of the invention, and FIG. 2 is a top view of the disc drive with the cover removed. The housing shown generally at 10 includes a top cover 11 and a housing 12 which has a plurality of rubber isolators 13 located at corners for mounting of the disc drive in a support frame. Within housing 10 is a spindle and drive motor shown at 14, and rotatably mounted on the spindle are a plurality of magnetic discs 16. Pickup heads 18 move across the surface of the discs 16 for reading and recording of data.

The pickup heads 18 are mounted to a carriage assembly shown generally at 20 which is driven by a linear motor shown generally at 22. The carriage assembly includes an upstanding tower portion 24 from which extend arms 26 which support the pickup heads 18. Carriage assembly 20 includes first and second pairs of rollers 28 at either end of the carriage assembly which engage a rail guide 30. Fifth and sixth rollers 32 engage the under side of outrigger plates 34 for maintaining the carriage assembly 20 upright. At one end of the carriage assembly 20 opposite from the pickup heads 18 is a coil 35 which is positioned within the linear motor 22.

Description of the linear motor 22 is best illustrated in the section view of FIG. 3 taken along the line 3—3 of FIG. 2 and FIGS. 4–8. Referring first to FIGS. 4 and 5, a top view and side view, respectively, of the linear motor are illustrated. Ears 40 are provided on the sides of the linear motor for mounting the motor 22 within the disc drive housing as illustrated in FIG. 2. The motor includes a housing portion 42 and an end plate 44 which are better illustrated in FIGS. 6A–6B and FIGS. 7 and 8. The end plate 44 includes integral first and second magnetic center pieces 46 around each of which is provided a shorted electrical turn 48 which conventionally comprises a sheet of copper. The shorted turn 48 is sufficiently long for engaging a mating center piece of the housing portion 42. An opening 50 is provided through the plate 44 between the two center pieces 46 through which a flexible cable can be provided for interconnection with the coil 35.

The housing portion 42 shown in perspective of FIG. 7 includes top and bottom surfaces, side surfaces, and one end surface, the end surface including integrally therewith center pieces 52 around which are provided the shorted turns 48. The end surface of the housing 42 has an opening 56 through which the carriage assembly can travel. The end plate 44 mates with the open end of housing 42 with the center pieces 46 of the end plate 44 mating with the center pieces 52 of the housing 42. Clearance holes 58 are provided on the end plate 44 for bolting of the end plate 44 to the open end of housing 42.

Referring now to the cross section view of FIG. 3, the rail 30 and carriage assembly including the coil 35 extend within the magnetic housing of the linear motor through the opening 56 shown in FIG. 7. The coil 35 is provided about and is magnetically coupled with the two magnetic center pieces 46 of the linear motor as illustrated.

In accordance with another feature of the invention, three magnets 60, 61, and 62 are mounted to the top and bottom surfaces and one side surface of the housing 42 in cooperative relationship with the first center piece 46. Similarly, three magnets 63, 64 and 65 are mounted to the top and bottom surfaces and the other side surface of the housing 42 in cooperative relationship with the second magnetic center piece. Accordingly, the magnetic flux pattern through the coil to the center pieces is enhanced.

FIG. 8 is an exploded section view of the linear motor taken along the line 8—8 of FIG. 3 and further illustrates the cooperative relationship of the housing 42, the end plate 44, the mating center pieces 46 and 52, and the coil 35 which is coupled with the center pieces.

There has been described a linear motor and carriage assembly with improved magnetic characteristics for driving a carriage assembly and with improved magnetic shielding of the motor from the outer environment. Importantly, the integral construction of the center pieces with the end surface of the housing and the end plate minimizes flux leakage which is attendant with a construction of discrete parts. Further, the split center poles result in flux densities approaching zero in the middle of the center pieces thus providing a more even magnetic flow between the two halves of the center pieces.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A linear motor and carriage assembly comprising
    a first magnetic housing component including top and bottom surfaces, side surfaces, and one end surface, said end surface including integral therewith first and second magnetic center pieces, said end surface including an opening between said first and second magnetic center pieces,
    a second magnetic housing component including an end plate for mating with said first magnetic housing component, said end plate including integral therewith first and second magnetic center pieces which mate with said first and second magnetic center pieces of said first magnetic housing component,
    first, second, and third magnets mounted to said top and bottom surfaces and one side surface of said housing in cooperative relationship with said first center piece,
    fourth, fifth, and sixth magnets mounted to said top and bottom surfaces and the other side surface of said housing in cooperative relationship with said second magnetic center piece, and
    a carriage assembly extending through said opening in said first magnetic housing component with coil means positioned within said first and second magnetic housing components and coupled to said first and second magnetic center pieces whereby energization of said coil means moves said carriage assembly.

2. The linear motor and carriage assembly as defined by claim 1 and further including a rail guide on which said carriage assembly rides, said rail guide extending into said housing through said central opening.

3. The linear motor and carriage assembly as defined by claim 1 and further including outrigger plates located on each side of said carriage assembly, said carriage assembly further including first roller means engaging said rail guide for moving said carriage assembly thereon, and second roller means engaging said outrigger plates for maintaining said carriage assembly upright.

4. The linear motor and carriage assembly as defined by claim 1 and further including first and second shorted turns positioned about said first magnetic center piece and about said second magnetic center piece, respectively.

5. For use in a linear motor, a magnetic assembly comprising
    a first magnetic housing component including top and bottom surfaces, side surfaces, and one end surface, said end surface including integral therewith first and second center pieces,
    a second magnetic housing component including an end plate mating with said first magnetic housing component, said end plate including integral therewith first and second magnetic center pieces which mate with said first and second magnetic center pieces of said first magnetic housing component,
    first, second, and third magnets mounted to said top and bottom surfaces and one side surface in cooperative relationship with said first center piece,
    fourth, fifth and sixth magnets mounted to said top and bottom surfaces and the other side surface in cooperative relationship with said second magnetic center piece.

6. The magnetic assembly as defined in claim 5 and further including coil means coupled to said first and second magnetic center pieces.

7. The magnetic assembly as defined by claim 5 and further including mechanical coupling means attached to said coil means and extending from said linear motor for translating a load in response to energization of said coil means.

* * * * *